United States Patent
Walker et al.

(10) Patent No.: US 11,580,499 B2
(45) Date of Patent: Feb. 14, 2023

(54) METHOD, SYSTEM AND COMPUTER-READABLE MEDIUM FOR INFORMATION RETRIEVAL

(71) Applicant: Randstad N.V., Diemen (NL)

(72) Inventors: Nicholas Walker, Atlanta, GA (US); Yirui Zhuang, Atlanta, GA (US); Sean Sanders, Atlanta, GA (US)

(73) Assignee: RANDSTAD N.V., Diemen (NL)

( * ) Notice: Subject to any disclaimer, the term of this patent is extended or adjusted under 35 U.S.C. 154(b) by 362 days.

(21) Appl. No.: 15/931,948

(22) Filed: May 14, 2020

(65) Prior Publication Data
US 2021/0357867 A1    Nov. 18, 2021

(51) Int. Cl.
G06F 40/289    (2020.01)
G06Q 10/1053    (2023.01)
G06N 20/00    (2019.01)
G06F 40/30    (2020.01)
G06F 16/2457    (2019.01)

(52) U.S. Cl.
CPC ... G06Q 10/1053 (2013.01); G06F 16/24578 (2019.01); G06F 40/289 (2020.01); G06F 40/30 (2020.01); G06N 20/00 (2019.01)

(58) Field of Classification Search
CPC .......... G06Q 10/1053; G06N 20/00; G06F 16/24578; G06F 40/289; G06F 40/30
See application file for complete search history.

(56) References Cited

U.S. PATENT DOCUMENTS

| | | | |
|---|---|---|---|
| 8,117,024 B2 | 2/2012 | Dane | |
| 2005/0182765 A1* | 8/2005 | Liddy | G06F 16/335 707/999.005 |

OTHER PUBLICATIONS

Alelyani et al.; "Feature Selection for Clustering: A Review", Data Clustering: Algorithms and Applications, pp. 29-60, Sep. 3, 2018.

* cited by examiner

*Primary Examiner* — Truong V Vo
(74) *Attorney, Agent, or Firm* — Nixon Peabody LLP; Jeffrey L. Costellia

(57) ABSTRACT

In a computer-implemented method for information retrieval and a processing system of a computer-implemented information retrieval system, an input text is received by a Natural Language Processing, NLP, suite, wherein the NLP suite comprises a plurality of models. At least one of the plurality of models is a model trained using selected features. The selected features are determined using a feature selection process. The input text is processed by each one of the plurality of models. An intermediate representation of the input text is generated by each one of the plurality of models. An enhanced representation of the input text is generated by combining a plurality of the generated intermediate representations. Information is retrieved based on the enhanced representation of the input text.

16 Claims, 4 Drawing Sheets

METHOD, SYSTEM AND COMPUTER-READABLE MEDIUM FOR INFORMATION RETRIEVAL

FIELD OF THE INVENTION

The present invention relates to methods, systems and computer-readable media for information retrieval. In particular, but not limited thereto, the present invention relates to information retrieval in the human resource, HR, industry.

BACKGROUND OF THE INVENTION

In the HR, industry or staffing industry, it is essential to have a reliable information retrieval system that may assist in matching candidates to vacancies, and vice versa. In recent years the prevalence of fast computers helped the development of automated and computer-implemented information retrieval systems.

Despite the increasing computational power, determining relevant keywords and phrases in texts for application specific domains is still a challenging problem. Usually, information retrieval systems analyze keyword search logs, leverage known keywords and phrases, known tags, or other types of labels. These are then used to assist in weighting processes for ranking search results.

However, there exists a need for an information retrieval system in the HR industry which can identify informative keywords and phrases without prior information, i.e., from unstructured HR data. Various existing approaches have relied on labelled data, wherein recorded data and logs of job seeker data is used to correlate job seekers with vacancies of employers, and to filter candidate profiles from search results. However, obtaining labelled data may not always be possible and is generally work intensive. Therefore, information retrieval systems have been developed that do not rely on labelled data.

For example, U.S. Pat. No. 8,117,024 B2 discloses systems and methods for automatically processing candidate resumes and job specifications expressed in natural language into a normalized form using frequency analysis. A database of elements is provided in which each element is expressed in natural language and at least some of which are associated with a corresponding set of synonymous words or phrases. Candidate resumes and job specifications are received in electronic form and expressed in natural language. The candidate resumes and job specifications are analyzed to extract elements expressed in candidate resumes and job specifications. The extracted elements are compared to the database. For each extracted element, the most frequent element or synonym is identified and used as a common form for the extracted element. A set of candidate resumes is matched with a corresponding job specification by comparing the set of elements expressed in common form for the resumes with the set of elements expressed in common form for the job specification.

However, the existing methods and systems for information retrieval in the HR industry that do not rely on labelled data have the drawback that elements in a determined representation associated to e.g. a vacancy or a candidate may not be very informative or may contain noise. Said representations therefore require unnecessary storage space and unnecessary computational power to provide informative information retrieval results, if even possible.

SUMMARY OF THE INVENTION

It would be desirable to provide a computer-implemented method and system for information retrieval in the HR industry that is more efficient.

In a first aspect of the present invention, a computer-implemented method for information retrieval is provided, the method comprising the steps of:
  receiving an input text by a Natural Language Processing, NLP, suite, wherein the NLP suite comprises a plurality of models, wherein at least one of the plurality of models is a model trained using selected features, wherein the selected features are determined using a feature selection process;
  processing the input text by each one of the plurality of models;
  generating an intermediate representation of the input text by each one of the plurality of models;
  generating an enhanced representation of the input text by combining a plurality of the generated intermediate representations, for information retrieval.

In an embodiment, at least one of the plurality of models is selected from a group containing topic models and word embedding models.

In an embodiment, all models are models trained using the same selected features.

In an embodiment, the feature selection process to determine the selected features comprises the steps of:
  a. receiving raw document data, associated with a plurality of documents, from a data source;
  b. processing the raw document data to obtain processed data;
  c. clustering the processed data in each one of a plurality of clusters;
  d. selecting features for each one of the clusters, based on the clustered processed data associated with the respective cluster;
  e. determining, based on the selected features and the clustered processed data associated with each one of the clusters, new processed data associated with the plurality of documents;
  f. repeating series of steps c-e at least once, wherein in step c the processed data is replaced with the new processed data determined in preceding step e.

In an embodiment, in step f the series of steps c-e is repeated until the new processed data determined in step e are substantially equal to the new processed data determined in a preceding series of steps c-e.

In an embodiment, the computer-implemented method further comprises the steps of:
  receiving a query;
  setting the input text equal to the query;
  comparing the enhanced representation associated with the query with a plurality of other enhanced representations based on different input texts;
  determining a matching score between the enhanced representation associated with the query and each one of the plurality of other enhanced representations.

In an embodiment, the computer-implemented method further comprises the steps of:
  ranking the plurality of the other enhanced representations based on the determined matching scores;
  providing at least one of the plurality of the other enhanced representations to a user based on the ranking.

In an embodiment, the input text is a job-posting, a candidate resume, a candidate profile, or at least one keyword.

The proposed computer-implemented method for information retrieval may have several advantages and/or effects with respect to existing methods for information retrieval in the HR industry.

Methods for information retrieval in the HR industry generally process texts related to e.g. jobs, vacancies and candidates. Therefore, these texts have a focus on a particular subject, which e.g. may be named 'HR related'. Nevertheless, comparable or similar texts may still use different words to describe similar aspect related to e.g. a job, vacancy or candidate, due to the flexibility a language offers. Consequently, it may be difficult to compare various texts with each other in an efficient manner.

The computer-implemented method for information retrieval according to the present invention uses a Natural Language Processing, NLP, suite to determine or create enhanced representations of texts, such that the determined or created enhanced representations contain more relevant or informative information and are such that they may be compared to other enhanced representations in a time-efficient and computing energy-efficient manner. Also the enhanced representations require less storage space since less non-informative data are stored.

To determine an enhanced representation of the input text, the NLP suite comprises a plurality of models, in particular machine learning models, to process the input text received by the NLP suite. These models are trained using data, as is commonly done in various forms of machine learning models. In the present invention, the models are trained using selected features determined by a feature selection process. Subsequently, the models do not require to be trained using structured and/or labelled data or search logs. Instead, the models are trained using selected features, wherein keywords or phrases have weights based on their respective informativeness (degree of information) as defined by the feature selection process. In this way, the trained models may generate more informative intermediate representations of the input text compared to models trained using also non-informative features, which may be determined using e.g. frequency counting. The models trained using selected features may therefore contain and/or generate little noise.

Each of the models may generate a distinguishable intermediate representation of the input text. The various intermediate representations may then be combined to have an enhanced representation of the input text. By combining a plurality of intermediate representations into an enhanced representation the dependency on one particular model may be reduced, improving the overall robustness of the proposed method.

Different variations of feature selection processes are known in the art. According to the present invention the feature selection process used to determine the selected features may not require labelled and/or structured data. During a feature selection process, raw document data is received. In the present invention this data may be related to the HR industry. The raw document data or corpus then serves to select features that are informative to the HR industry. The raw document data may be processed to make the raw document data suitable for further usage. Therefore, processed data is obtained from the raw document data. The processed data may then be clustered using one or more of the clustering techniques known in the art. Here, the clustering does not require the data to be labelled or structured. After the clusters are obtained, for each of the clusters features are selected that are informative to the respective cluster. Using the clusters and in particular the selected features associated with the clusters may then be used to update the processed data, i.e. to create new processed data. Some terms in the processes data may become less relevant, while other terms may become more relevant. This new processed data may be clustered again, and based on the new clusters, new selected features may be obtained. Using the new selected features another new processed data may be determined. This process of clustering, selecting features, and obtaining new processed data may be repeated until the selected features do not change substantially. As a result, selected features are obtained that are highly informative for texts related to the HR industry. Using these features to train the models comprised in the NLP suite then permits the models to be more focused and to contain less noise, such that they are more time-efficient and energy-efficient in terms of computing power.

Information retrieval may be based on the enhanced representation of the input text, as generated by the method of the invention. The proposed computer-implemented method for information retrieval is suitable to obtain a plurality of enhanced representations, each associated with a respective input text. In the HR industry for each job description, vacancy or candidate profile a respective enhanced representation may be obtained. Once these plurality of enhanced representations are stored in a database, a new enhanced representation may be efficiently compared to other enhanced representations obtained previously.

The proposed computer-implemented method for information retrieval may in particular be used to process a posed query. The query may be handled as the input text by the NLP suite, such that an enhanced representation associated with the query may be obtained. This enhanced representation associated with the query may be compared with other enhanced representations (based on different input texts) stored in a database. Depending on the similarity between the enhanced representation associated with the query and each of the other enhanced representation a matching score may be determined, indicating which of the other enhanced representations may be most relevant to the posed query. Based on the matching score the other enhanced representation may be ranked, and some of the other enhanced representations may be provided to a user based on the ranking.

In a second aspect of the present invention, a non-transient computer readable medium containing program instructions is provided for causing a computer to perform the computer-implemented method according to the first aspect of the invention.

In a third aspect of the present invention, a computer-implemented information retrieval system is provided, comprising a processing system comprising a Natural Language Processing, NLP, suite, wherein the processing system is configured to:
  receive an input text;
  provide the input text to the NLP suite, wherein the NLP suite comprises a plurality of models, wherein at least one of the plurality of models is a model trained using selected features, wherein the selected features are determined using a feature selection process;
  process the input text by each one of the plurality of models;
  generate an intermediate representation of the input text by each one of the plurality of models;
  generate an enhanced representation of the input text by combining a plurality of the generated intermediate representations, for information retrieval.

In an embodiment of the computer-implemented information retrieval system, at least one of the plurality of models is selected from a group containing topic models and word embedding models.

In an embodiment of the computer-implemented information retrieval system, all models are models trained using the same selected features.

In an embodiment, the computer-implemented information retrieval system further comprises a feature selection system to perform feature selection to determine the selected features, wherein the feature selection system is configured to:

g. receive raw document data, associated with a plurality of documents, from a data source;
h. process the raw document data to obtain processed data;
i. cluster the processed data in each one of a plurality of clusters;
j. select features for each one of the clusters, based on the clustered processed data associated with the respective cluster;
k. determine, based on the selected features and the clustered processed data associated with each one of the clusters, new processed data associated with the plurality of documents;
l. repeat series of steps i-k at least once, wherein in step i the processed data is replaced with the new processed data determined in preceding step k.

In an embodiment of the computer-implemented information retrieval system, the feature selection system further is configured to, in step l, repeat the series of steps i-k until the new processed data determined in step k are substantially equal to the new processed data determined in a preceding series of steps i-k.

In an embodiment, the computer-implemented information retrieval system further comprises a training system configured to train at least one of the plurality of models using the selected features.

In an embodiment, the computer-implemented information retrieval system further comprises an input system configured to receive a query, wherein the processing system further is configured to:

set the input text equal to the query;
compare the enhanced representation associated with the query with a plurality of other enhanced representations based on different input texts;
determine a matching score between the enhanced representation associated with the query and each one of the plurality of other enhanced representations.

In an embodiment of the computer-implemented information retrieval system, the processing system further is configured to rank the plurality of the other enhanced representations based on the determined matching scores; and the computer-implemented information retrieval system further comprises an output system configured to provide at least one of the plurality of the other enhanced representations to a user based on the ranking.

In an embodiment, the input text is a job-posting, a candidate resume, a candidate profile, or at least one keyword.

The second aspect of the invention and the third aspect of the invention provide the same or similar advantages and/or effects as the first aspect of the invention.

These and other aspects of the invention will be more readily appreciated as the same becomes better understood by reference to the following detailed description and considered in connection with the accompanying drawings in which like reference symbols designate like parts.

BRIEF DESCRIPTIONS OF THE DRAWINGS

Figure 4:
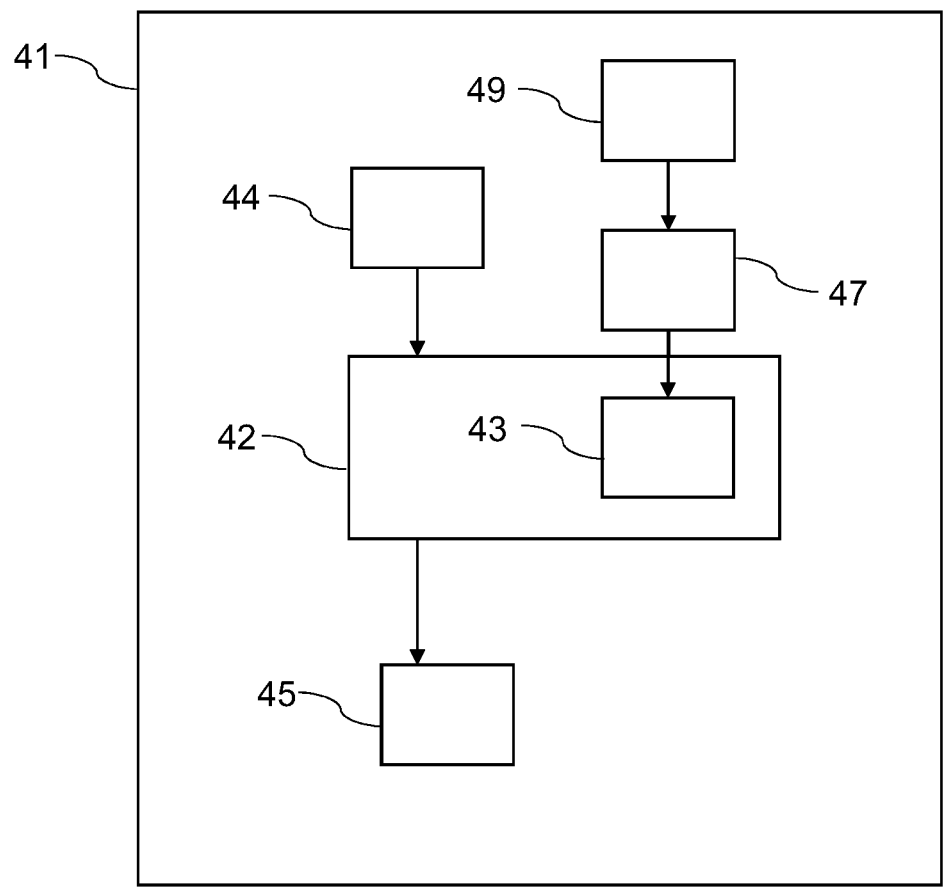

FIG. 4 schematically depicts an embodiment of a computer-implemented information retrieval system according to the invention.

DETAILED DESCRIPTION OF EMBODIMENTS

Figure 1:
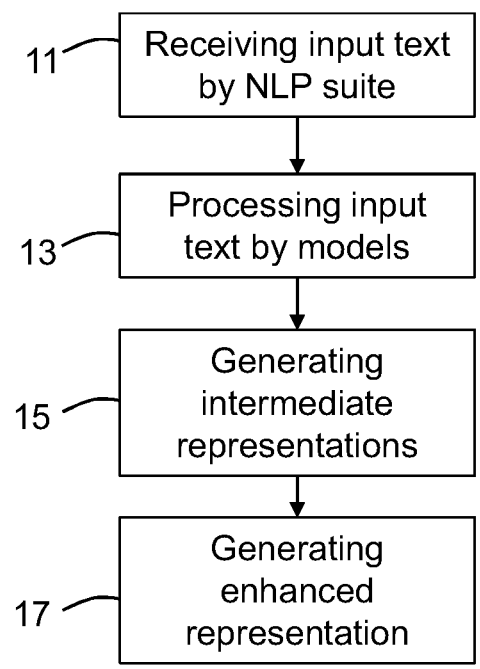
FIG. 1 depicts a first flow diagram of an embodiment of a computer-implemented method for information retrieval according to the invention.

FIG. 1 depicts a first flow diagram of an embodiment of a computer-implemented method for information retrieval according to the invention.

A step 11, which may be performed by a computer processing system, such as a server, comprises receiving an input text by a Natural Language Processing, NLP, suite, wherein the NLP suite comprises a plurality of models, wherein at least one of the plurality of models is a model trained using selected features, wherein the selected features are determined using a feature selection process.

The input text is text related to the HR industry. For example, the input text may be a job-posting, a candidate resume or a candidate profile. The input text may be provided by an input system. The input system may be a computer wherein the input text is stored in a database or wherein the input text is provided via a keyboard, touch screen, speech recognition device or any other appropriate input device. The input text may be obtained after pre-processing an initial text. Pre-processing may comprise tokenization and/or the use of bag-of-words techniques. Other techniques may be used as well to transform the initial text into an input text that may be received by the NLP suite.

The NLP suite comprises a plurality of models. When the NLP suite receives the input text, each of the plurality of models may receive the input text. The models may be mathematical models, and in particular machine learning models that are suitable to process text or textual data. An example of a suitable model is a word embedding, such as word2vec, glove etc. Another example of a suitable model is a topic model using e.g. Latent Dirichlet Allocation, LDA, and/or latent semantic analysis. Topic modelling may be particular suitable as documents in the HR industry often have only one single topic, making the training of the model more efficient.

However, as some document may comprise various topics, such as candidate resumes, topic models may work less well. Having a plurality of models in the NLP suite therefore contribute to the robustness of the overall system, since it increases the likelihood that the input text may be represented well in at least one intermediate representation.

At least one of the plurality of models is trained using the selected features. In some embodiments, all models are trained using the selected features. In particular, all models may be trained using the same selected features. However, models may be trained using different selected features as well. For example, a particular model may be added to the NLP suite at a later moment, and may be trained using an updated set of selected features.

The selected features are determined using a feature selection process. The feature selection process may remove features from the data or texts that are redundant or irrelevant, and can be removed without much loss of information. Generally, the feature selection process may include wrappers, filters and/or embedded methods. However, other methods may be used as well.

A step 13, which may be performed by a computer processing system, such as a server, comprises processing the input text by each one of the plurality of models. In step 13 the input text is provided to the plurality of models which further process the input text. The particular processing depends on the type of model.

A step 15, which may be performed by a computer processing system, such as a server, comprises generating an intermediate representation of the input text by each one of the plurality of models.

As an output, a respective model comprised in the NLP suite generates a respective intermediate representation of the input text.

A step 17, which may be performed by a computer processing system, such as a server, comprises generating an enhanced representation of the input text by combining a plurality of the generated intermediate representations. Information retrieval may be based on the enhanced representation.

For example, the plurality of intermediate representations associated with the plurality of models may be concatenated to obtain an enhanced representation of the input text. The enhanced representation may be represented as multiple individual fields, wherein each field may be given a different weight to facilitate a better ranking. An high-level example of an enhanced representation is:

1. "Normal Document Field 1—Job Title"=A
2. "Normal Document Field 2—Job Description"=B
3. "Intermediate representation 1—LDA_Model"=X
4. "Intermediate representation 2—Classification_Model"=Y
5. "Intermediate representation 3—word2vec"=Z
6. . . .

Here, X, Y and Z comprise information from the respective models trained using the selected features.

Generating enhanced representations as described in the above for various input texts permits that an arbitrary input string or document may be analyzed to extract keywords and phrases based upon the same selected features and the associated trained models. This element of the proposed process allows for a unified interface between data stored in a database and retrieved therefrom, and real-time input, wherein precise comparisons may be made. Stored enhanced representations associated with documents may be analyzed and augmented by the same process that is used in analyzing real-time input in e.g. a query system, resulting in an enhanced representation that may efficiently be compared with other enhanced representations. This is particularly important when results of a comparison have to be provided fast to a user.

At least one of the computer processing systems, or servers, referred to in conjunction with steps 11, 13, 15 and 17 may be separate from at least one of the other processing systems, or servers, and interconnected to exchange data between them to perform the different steps, or the computer processing systems, or servers, referred to in conjunction with steps 11, 13, 15 and 17 may form one processing system, or server.

Figure 2:
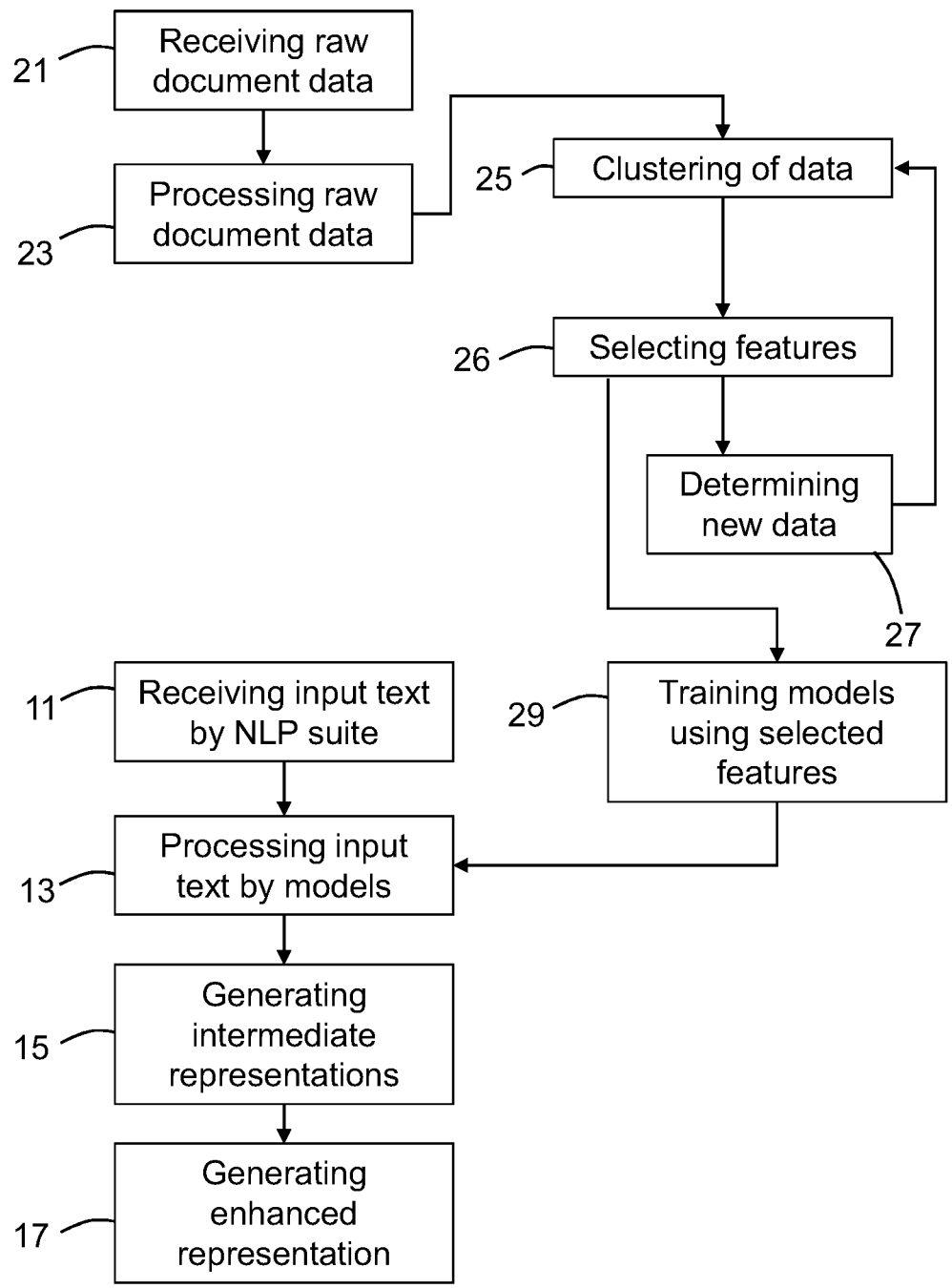
FIG. 2 depicts a second flow diagram of an embodiment of a computer-implemented method for information retrieval according to the invention, wherein the first flow diagram depicted in FIG. 1 is extended with steps related to a feature selection process.

FIG. 2 depicts a second flow diagram of an embodiment of a computer-implemented method for information retrieval according to the invention, wherein the first flow diagram depicted in FIG. 1 is extended with steps related to a feature selection process, wherein steps 11, 13, 15 and 17 have been described above in conjunction with FIG. 1.

The feature selection process to determine the selected features comprises the steps 21-29.

A step 21, which may be performed by a computer processing system, such as a server, comprises receiving raw document data, associated with a plurality of documents, from a data source.

A step 23, which may be performed by a computer processing system, such as a server, comprises processing the raw document data to obtain processed data. The proposed computer-implemented method for information retrieval is particularly suitable for generating enhanced representations associated with unstructured data or texts, by following a systematic process for identifying key words and phrases for information retrieval or search applications. First, the unstructured raw document data is represented in a more suitable machine readable way, e.g. by numerically encoding individual words and n-grams. Therefore, each document may be represented as an indexed set of numbers representing the words according to a given algorithm. This algorithmic transformation of text may be based upon the relative frequency of words in the document, a binary encoding (0 or 1) which indicates the presence or absence of the word in the document, or some other method. Words may also be omitted from this representation if they are extremely frequent and generally uninformative to the semantic content of a document, such as stopgaps like 'the', 'of', 'at', etc.

A step 25, which may be performed by a computer processing system, such as a server, comprises clustering the processed data in each one of a plurality of clusters.

Once the documents or raw document data have been given an initial machine-readable representation, i.e. processed data has been obtained, further analysis may be performed. The proposed method leverages a class of algorithms known as clustering. This is an "unsupervised" machine learning technique, which is not trained to predict known labels of the data, like it is done using "supervised" learning. Instead, the use of proposed clustering algorithms make use of the data to find latent structure which may be used to group parts of the data together to form clusters. Frequently the number of clusters to be discovered is a hyperparameter which may be specified before model training. An example clustering algorithm would be the well-known k-means clustering algorithm, in which a predefined number k points, called "centroids", are randomly placed in the data representation space, and data points are initially assigned to a cluster according to the centroid nearest to them. The centroids are then relocated to the location of the mean of their associated cluster of data points, and data points are then reassigned to the cluster of the nearest centroid. This process is then repeated until the centroids reach a stable equilibrium, and the cluster assignments for the data points can then be considered a final output.

However, the proposed method is not restricted to the use of a particular clustering algorithm.

In the case of HR data, clustering algorithms may be employed to associate similar job posting documents with each other, as well as to sort dissimilar documents to separate groups. The proposed method makes use of clustering for this purpose, giving an initial method to organize/group job postings data.

A step 26, which may be performed by a computer processing system, such as a server, comprises selecting features for each one of the clusters, based on the clustered processed data associated with the respective cluster.

The clusterings may be used in a subsequent algorithm which may take advantage of the inferred structure to extract further information from the data. This process is known as feature selection, and may be performed with a variety of algorithms, such as supervised learning methods or correlation based approaches. As an example of a supervised learning algorithm, the cluster assignments may be used for classification, wherein a statistical model is trained to predict a cluster label from input data. This type of model employs various weights to features of documents (words, n-grams, etc.) to make predictions. After training these weights may be used to assess the relative importance of features to given classes. Equally important are the features themselves which are selected in this process, as they are used to train the models comprised in the NLP suite.

A step 27, which may be performed by a computer processing system, such as a server, comprises determining, based on the selected features and the clustered processed data associated with each one of the clusters, new processed data associated with the plurality of documents. As described in the above, the new processed data may be clustered again, as indicated by the process flow to step 25, and the selected features may be updated. This iterative process may continue until the selected features or models converge to a stable equilibrium, or when a certain amount of time has lapsed.

A step 29, which may be performed by a computer processing system, such as a server, comprises the training of the models using the selected features. In case not only selected features are used in the training of the models, the trained models may not be focused. For example, in the phrase "The accountant has skills in java, gaap, and algorithmic trading", normal features would include a simple bag-of-words representation such as "the", "accountant", "has", "skills", "in", "java", "gaap", "and", "algorithmic", "trading". Subsequently, the model may be trained using non-informative features, rendering the determined intermediate representations less informative or only informative after a further processing to remove the uninformative features, which would require additional computational power.

On the other hand, possible selected features may be "accountant", "java", "gaap", "algorithmic trading". Not only these selected features more informative, also the number of the selected features is less than the 'normal features', reducing memory requirement. The possible selected features are more focused and allows for the models or machine learning models to train and identify relationships between words without becoming 'confused' by irrelevant 'noisy' terms or features.

At least one of the computer processing systems, or servers, referred to in conjunction with steps 21, 23, 25, 16, 27 and 29 may be separate from at least one of the other processing systems, or servers, and interconnected to exchange data between them to perform the different steps, or the computer processing systems, or servers, referred to in conjunction with steps 21, 23, 25, 16, 27 and 29 may form one processing system, or server.

Figure 3:
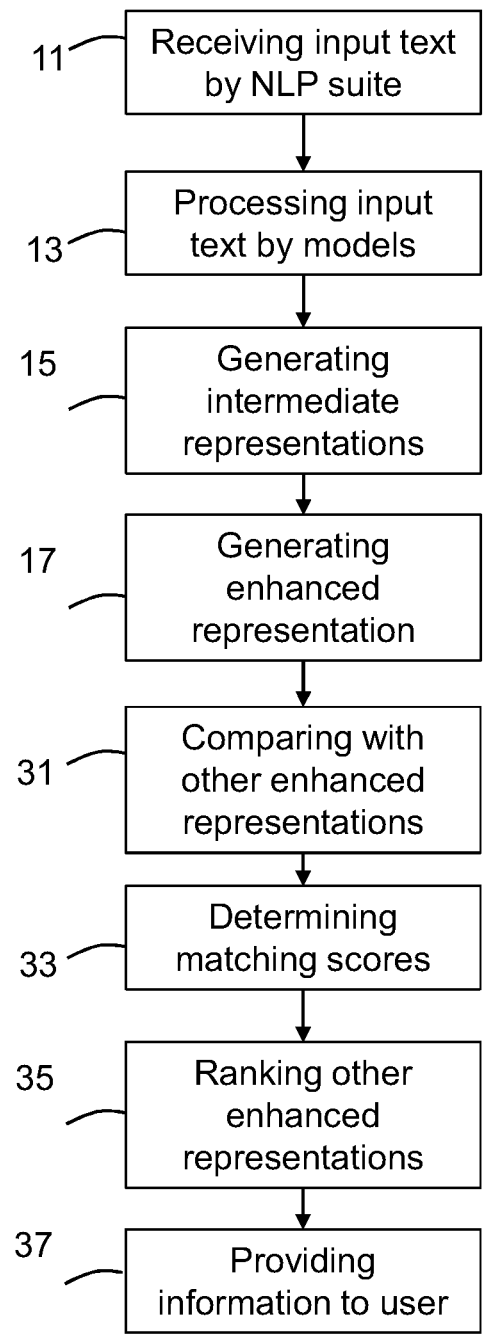
FIG. 3 depicts a third flow diagram of an embodiment of a computer-implemented method for information retrieval according to the invention, wherein the first flow diagram depicted in FIG. 1 is extended with steps related to processing a query.

FIG. 3 depicts a third flow diagram of an embodiment of a computer-implemented method for information retrieval according to the invention, wherein the first flow diagram depicted in FIG. 1 is extended with steps related to processing a query. Steps 11, 13, 15 and 17 have been described above in conjunction with FIG. 1.

The proposed method enables to infer sets of semantically related words and phrases, and constructs an enhanced representation of the user input, even if it is only a single word. This enhanced representation associated with a posed query can then be used to return highly related documents to the user by comparing and sorting by the attributes of the available documents. As outlined before, this takes the form of inferred keywords, phrases, and topics, as well as weights for these attributes, which can then be used in sorting the queried documents and their associated enhanced representations. This provides a highly interpretable and intuitive system from which a user such as a recruiter can give a sparse and general input and nonetheless receive highly relevant results for e.g. their candidate search.

According to the present invention, first a query is received, which may be set to the input text to the NLP suite.

A step 31, which may be performed by a computer processing system, such as a server, comprises comparing the enhanced representation associated with the query with a plurality of other enhanced representations based on other input texts.

A step 33, which may be performed by a computer processing system, such as a server, comprises determining a matching score between the enhanced representation associated with the query and each one of the plurality of other enhanced representations.

A step 35, which may be performed by a computer processing system, such as a server, comprises ranking the plurality of the other enhanced representations based on the determined matching scores.

A step 37, which may be performed by a computer processing system, such as a server, comprises providing at least one of the plurality of the other enhanced representations to a user based on the ranking.

At least one of the computer processing systems, or servers, referred to in conjunction with steps 31, 33, 35 and 37 may be separate from at least one of the other processing systems, or servers, and interconnected to exchange data between them to perform the different steps, or the computer processing systems, or servers, referred to in conjunction with steps 31, 33, 35 and 37 may form one processing system, or server.

Typically, the steps depicted in FIGS. 1, 2 and 3 are carried out or performed by a computer-implemented information retrieval system. To do so, the necessary instructions for the computer are generally stored on or in a non-transient computer readable medium containing the relevant program instructions. In FIG. 4, an example of a computer-implemented information retrieval system according to the invention is provided.

FIG. 4 schematically depicts a computer-implemented information retrieval system 41 according to the invention. The information retrieval system 41 is configured to carry out the steps or at least some of the steps depicted in the flow diagrams in FIGS. 1 to 3. Accordingly, different parts of the information retrieval system 41 may be understood by reference to the description of the FIGS. 1 to 3.

The information retrieval system 41 comprises a processing system 42 comprising a Natural Language Processing, NLP, suite 43. The processing system may be a general computing system as is known in the art, comprising typical computing hardware such as a processing unit and a memory device. The processing system 42 is configured to receive an input text, e.g. from an input system 44. The input system may comprise a keyboard or touchscreen such that a user may provide input text manually, or the input system may comprise alternatively or additionally an input memory device wherein possible input texts are stored. The input system may further be configured to recognize speech and convert it to text. The input text may be a job-posting, a candidate resume, a candidate profile or at least one keyword. For example, a job-posting, a candidate resume, or a candidate profile may be stored in the input memory device, whereas at least one keyword may be provided by the user using a keyboard. The processing system 42 further is configured to provide the input text to the NLP suite 43. The NLP suite 43 comprises a plurality of models, wherein at least one of the plurality of models is a model trained using selected features. The at least one of the plurality of models may be selected from a group containing topic models and word embedding models.

The training may be performed using a training system 47, which may be any system known in the art that may be used to train machine learning, statistical models and the like. The training system 47 may be adapted to the models in the NLP suite.

The selected features are determined using a feature selection process performed by a feature selection system 49. All models may be trained, e.g. by the training system 44, using the same selected features determined by the feature selection system 49.

The processing system 42 further is configured to process the input text by each one of the plurality of models, to generate an intermediate representation of the input text by each one of the plurality of models and to generate an enhanced representation of the input text by combining a plurality of the generated intermediate representations. Information retrieval may be based on the enhanced representation of the input text.

The feature selection system 49 is configured to perform feature selection to determine the selected features. The feature selection system 49 is configured to:

g. receive raw document data, associated with a plurality of documents, from a data source;
h. process the raw document data to obtain processed data, wherein the processed data is suitable for further clustering;
i. cluster the processed data in each one of a plurality of clusters;
j. select features for each one of the clusters, based on the clustered processed data associated with the respective cluster;
k. determine, based on the selected features and the clustered processed data associated with each one of the clusters, new processed data associated with the plurality of documents;
l. repeat series of steps i-k at least once, wherein in step i the processed data are replaced with the new processed data determined in preceding step k.

The feature selection system 49 may further be configured to, in step l, repeat series of steps i-k until the new processed data determined in step k are substantially equal to the new processed data determined in a preceding series of steps i-k.

The computer-implemented information retrieval system 41 may comprise an input system 44 configured to receive a query. The processing system 42 further is configured to:

set the input text equal to the query;
compare the enhanced representation associated with the query with a plurality of other enhanced representations;
determine a matching score between the enhanced representation associated with the query and each one of the plurality of other enhanced representations.

The processing system 42 may further be configured to rank the plurality of the other enhanced representations based on the determined matching scores. In an embodiment, the computer-implemented information retrieval system 41 further comprises an output system 45 configured to provide at least one of the plurality of the other enhanced representations to a user based on the ranking. The output system may comprise a display to facilitate providing the output to the user.

As explained in detail above, in a computer-implemented method for information retrieval and a processing system of a computer-implemented information retrieval system, an input text is received by a Natural Language Processing, NLP, suite, wherein the NLP suite comprises a plurality of models. At least one of the plurality of models is a model trained using selected features. The selected features are determined using a feature selection process. The input text is processed by each one of the plurality of models. An intermediate representation of the input text is generated by each one of the plurality of models. An enhanced representation of the input text is generated by combining a plurality of the generated intermediate representations. Information is retrieved based on the enhanced representation of the input text.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The invention claimed is:

1. A computer-implemented method for information retrieval, the method comprising the steps of:

receiving an input text by a Natural Language Processing, NLP, suite, wherein the NLP suite comprises a plurality of models, wherein at least one of the plurality of models is a model trained using selected features, wherein the selected features are determined using a feature selection process;
processing the input text by each one of the plurality of models;
generating an intermediate representation of the input text by each one of the plurality of models;
generating an enhanced representation of the input text by combining a plurality of the generated intermediate representations, for information retrieval,
wherein the feature selection process to determine the selected features comprises the steps of:

(a) receiving raw document data, associated with a plurality of documents, from a data source;
(b) processing the raw document data to obtain processed data;
(c) clustering the processed data in each one of a plurality of clusters;
(d) selecting features for each one of the clusters, based on the clustered processed data associated with the respective cluster;
(e) determining, based on the selected features and the clustered processed data associated with each one of the clusters, new processed data associated with the plurality of documents; and
(f) repeating series of steps (c) to (e) at least once, wherein in step c the processed data are replaced with the new processed data determined in preceding step (e).

2. The computer-implemented method according to claim 1, wherein at least one of the plurality of models is selected from a group containing topic models and word embedding models.

3. The computer-implemented method according to claim 1, wherein all models are models trained using the same selected features.

4. The computer-implemented method according to claim 1, wherein in step (f) the series of steps (c) to (e) is repeated until the new processed data determined in step (e) are substantially equal to the new processed data determined in a preceding series of steps (c) to (e).

5. The computer-implemented method according claim 1, further comprising the steps of:
receiving a query;
setting the input text equal to the query;
comparing the enhanced representation associated with the query with a plurality of other enhanced representations based on different input texts;
determining a matching score between the enhanced representation associated with the query and each one of the plurality of other enhanced representations.

6. The computer-implemented method according to claim 5, further comprising the steps of:
ranking the plurality of the other enhanced representations based on the determined matching scores;
providing at least one of the plurality of the other enhanced representations to a user based on the ranking.

7. The computer-implemented method according to claim 1, wherein the input text is a job-posting, a candidate resume, a candidate profile or at least one keyword.

8. A non-transient computer readable medium containing program instructions for causing a computer to perform the computer-implemented method according to claim 1.

9. A computer-implemented information retrieval system comprising a processing system comprising a Natural Language Processing, NLP, suite, wherein the processing system is configured to:
receive an input text;
provide the input text to the NLP suite, wherein the NLP suite comprises a plurality of models, wherein at least one of the plurality of models is a model trained using selected features, wherein the selected features are determined using a feature selection process;
process the input text by each one of the plurality of models;
generate an intermediate representation of the input text by each one of the plurality of models;
generate an enhanced representation of the input text by combining a plurality of the generated intermediate representations, for information retrieval,
the information retrieval system further comprising a feature selection system configured to
perform the feature selection process, wherein the feature selection system is configured to:
(g) receive raw document data, associated with a plurality of documents, from a data source;
(h) process the raw document data to obtain processed data;
(i) cluster the processed data in each one of a plurality of clusters;
(j) select features for each one of the clusters, based on the clustered processed data associated with the respective cluster;
(k) determine, based on the selected features and the clustered processed data associated with each one of the clusters, new processed data associated with the plurality of documents; and
(l) repeat series of steps (i) to (k) at least once, wherein in step (i) the processed data are replaced with the new processed data determined in preceding step (k).

10. The computer-implemented information retrieval system according to claim 9, wherein the at least one of the plurality of models is selected from a group containing topic models and word embedding models.

11. The computer-implemented information retrieval system according to claim 9, wherein all models are models trained using the same selected features.

12. The computer-implemented information retrieval system according to claim 9, wherein the feature selection system further is configured to:
in step (l), repeat series of steps (i) to (k) until the new processed data determined in step (k) are substantially equal to the new processed data determined in a preceding series of steps (i) to (k).

13. The computer-implemented information retrieval system according to claim 9, further comprising a training system configured to train at least one of the plurality of models using the selected features.

14. The computer-implemented information retrieval system according to claim 9, further comprising an input system configured to receive a query, and wherein the processing system further is configured to:
set the input text equal to the query;
compare the enhanced representation associated with the query with a plurality of other enhanced representations based on different input texts;
determine a matching score between the enhanced representation associated with the query and each one of the plurality of other enhanced representations.

15. The computer-implemented information retrieval system according to claim 14, wherein the processing system further is configured to rank the plurality of other enhanced representations based on the determined matching scores; and
wherein the computer-implemented information retrieval system further comprises an output system configured to provide at least one of the plurality of the other enhanced representations to a user based on the ranking.

16. The computer-implemented information retrieval system according to claim 9, wherein the input text is a job-posting, a candidate resume, a candidate profile or at least one keyword.

* * * * *